US012753114B2

(12) United States Patent
Lu et al.

(10) Patent No.: US 12,753,114 B2
(45) Date of Patent: Oct. 6, 2026

(54) SUNROOF GLASS AND VEHICLE

(71) Applicant: FUJIAN WANDA AUTOMOBILE GLASS INDUSTRY CO., LTD., Fuqing Fuzhou (CN)

(72) Inventors: Yuemin Lu, Fuqing Fuzhou (CN); Jun Lin, Fuqing Fuzhou (CN); Zhixin Chen, Fuqing Fuzhou (CN)

(73) Assignee: FUJIAN WANDA AUTOMOBILE GLASS INDUSTRY CO., LTD., Fuqing Fuzhou (CN)

( * ) Notice: Subject to any disclaimer, the term of this patent is extended or adjusted under 35 U.S.C. 154(b) by 59 days.

(21) Appl. No.: 18/753,167

(22) Filed: Jun. 25, 2024

(65) Prior Publication Data

US 2024/0343638 A1 Oct. 17, 2024

Related U.S. Application Data

(63) Continuation of application No. PCT/CN2023/071636, filed on Jan. 10, 2023.

(30) Foreign Application Priority Data

Jan. 28, 2022 (CN) ......................... 202210109009.0

(51) Int. Cl.
*C03C 17/36* (2006.01)

(52) U.S. Cl.
CPC ........ *C03C 17/3605* (2013.01); *C03C 17/366* (2013.01); *C03C 2217/231* (2013.01); *C03C 2217/241* (2013.01)

(58) Field of Classification Search
None
See application file for complete search history.

(56) References Cited

U.S. PATENT DOCUMENTS

2007/0188871 A1* 8/2007 Fleury ................. C03C 17/3435 359/586
2009/0011205 A1* 1/2009 Thiel ................... C03C 17/3681 428/215

(Continued)

FOREIGN PATENT DOCUMENTS

CN 1363530 A 8/2002
CN 101250688 A 8/2008

(Continued)

OTHER PUBLICATIONS

Extended European search report issued in corresponding European application No. 23745947.4 dated Mar. 7, 2025.

(Continued)

*Primary Examiner* — Kim S. Horger
(74) *Attorney, Agent, or Firm* — Scully, Scott, Murphy & Presser, P.C.

(57) ABSTRACT

Sunroof glass and vehicle are provided. The sunroof glass includes a glass substrate, a metal absorption layer, and an anti-reflective layer. The glass substrate has an outer surface and an inner surface. The metal absorption layer and the anti-reflective layer are sequentially stacked on the inner surface in a direction away from the glass substrate. The anti-reflective layer includes at least one stacking including a high refractive-index layer and a low refractive-index layer. The high refractive-index layer has a refractive index greater than or equal to 1.7. The low refractive-index layer has a refractive index less than 1.7.

15 Claims, 5 Drawing Sheets

(56) References Cited

U.S. PATENT DOCUMENTS

| | | | | |
|---|---|---|---|---|
| 2013/0094076 | A1* | 4/2013 | O'Connor | C03C 17/245 359/360 |
| 2014/0334006 | A1 | 11/2014 | Adib et al. | |
| 2020/0310014 | A1 | 10/2020 | Bard et al. | |
| 2021/0387513 | A1* | 12/2021 | Bard | B32B 17/10174 |

FOREIGN PATENT DOCUMENTS

| | | | | | |
|---|---|---|---|---|---|
| CN | 102653151 | A | | 9/2012 | |
| CN | 102922825 | A | | 2/2013 | |
| CN | 103753897 | A | | 4/2014 | |
| CN | 103958431 | A | | 7/2014 | |
| CN | 204895061 | U | | 12/2015 | |
| CN | 105636919 | A | | 6/2016 | |
| CN | 106517815 | A | | 3/2017 | |
| CN | 108515752 | A | | 9/2018 | |
| CN | 108911527 | A | | 11/2018 | |
| CN | 110461786 | A | | 11/2019 | |
| CN | 111777337 | A | | 10/2020 | |
| CN | 211942405 | U | | 11/2020 | |
| CN | 112802918 | A | | 5/2021 | |
| CN | 113267925 | A | | 8/2021 | |
| CN | 114057407 | A | | 2/2022 | |
| EP | 1313674 | B1 | * | 6/2004 | C03B 18/04 |
| EP | 3560700 | A1 | * | 10/2019 | C03C 17/366 |
| EP | 4361113 | A1 | | 5/2024 | |
| EP | 4 434 950 | A1 | | 9/2024 | |
| JP | 2000290044 | A | | 10/2000 | |
| JP | 2009526700 | A | | 7/2009 | |
| WO | 2021095650 | A1 | | 5/2021 | |
| WO | 2021105959 | A1 | | 6/2021 | |
| WO | 2023116878 | A1 | | 6/2023 | |

OTHER PUBLICATIONS

The first office action issued in corresponding KR application No. 10-2024-7021468 dated Mar. 24, 2025.

Notice of Reasons for Refusal issued in corresponding JP application No. 2024-538356 dated Aug. 1, 2025.

International Search Report dated May 6, 2023 issued in PCT/CN2023/071636.

Chinese First Office Action dated Jun. 12, 2023 issued in CN 202210109009.0.

Chinese Second Office Action dated Oct. 26, 2023 issued in CN 202210109009.0.

Decision to Refuse dated Apr. 28, 2024 issued in CN 202210109009.0.

Japanese Notice of Reasons for Refusal dated Jan. 5, 2026 received in Japanese Patent Application No. 2024-538356.

European Third Party Observations dated Feb. 13, 2026 received in European Application No. 23745947.4.

* cited by examiner

SUNROOF GLASS AND VEHICLE

CROSS-REFERENCE TO RELATED APPLICATION(S)

This application is a continuation of International Application No. PCT/CN2023/071636, filed Jan. 10, 2023, which claims priority to Chinese Patent Application No. 202210109009.0, filed Jan. 28, 2022, the entire disclosures of which are incorporated herein by reference.

TECHNICAL FIELD

This disclosure relates to the field of transport means technology, and in particular to sunroof glass and a vehicle.

BACKGROUND

With continuous development of vehicle industries, more and more vehicles improve daylighting and appearance thereof by improving structures of sunroof glass. However, as an area of the sunroof glass increases, too much light enters the vehicle, which not only affects visual sensory experiences of passengers, but also rises temperature inside the vehicle and affects the thermal comfort inside the vehicle. In the related art, improvement is made by reducing a visible-light transmittance of the sunroof glass. For example, tinted glass or tinted polyvinyl butyral (PVB) are employed, or a dimming element is additionally disposed. Although the visible-light transmittance of the sunroof glass is reduced, a visible-light reflectivity of the sunroof glass measured at the inner side of the vehicle is still high. As a result, an obvious mirror effect occurs on the sunroof glass, and a display of a center console or displays of other electronic devices inside the vehicle each may produce a sharp reflection on the sunroof glass, which seriously disturbs rear passengers.

SUMMARY

In a first aspect, sunroof glass is provided in the present disclosure. The sunroof glass includes a glass substrate, a metal absorption layer, and an anti-reflective layer. The glass substrate has an outer surface and an inner surface. The metal absorption layer and the anti-reflective layer are sequentially stacked on the inner surface in a direction away from the glass substrate. The anti-reflective layer includes at least one stacking including a high refractive-index layer and a low refractive-index layer. The high refractive-index layer has a refractive index greater than or equal to 1.7. The low refractive-index layer has a refractive index less than 1.7.

In a second aspect, a vehicle is provided in the present disclosure. The vehicle includes a vehicle body and the sunroof glass in the first aspect. The sunroof glass is connected to the vehicle body.

BRIEF DESCRIPTION OF THE DRAWINGS

To describe the technical solutions in the present disclosure more clearly, the accompanying drawings for use in implementations are briefly described below. Apparently, the accompanying drawings in the following description show merely some implementations of the present disclosure, and those of ordinary skill in the art may obtain other accompanying drawings from these accompanying drawings without creative effort.

DETAILED DESCRIPTION

Specific embodiments of the present disclosure will be described in more detail below with reference to the accompanying drawings. Although exemplary implementations of the present disclosure are shown in the accompanying drawings, it may be understood that the present disclosure may be implemented in other ways than those described herein. Therefore, the present disclosure is not limited to the following implementations.

Reference can be made to FIG. 1 to FIG. 9 together, sunroof glass 10 and a vehicle 100 are provided in embodiments of the present disclosure, which can reduce a visible-light reflectivity of the sunroof glass 10 measured from the inside of the vehicle. Therefore, a mirror effect of the sunroof glass when viewed from the inside of the vehicle is eliminated, so that a passenger has a better visual experience when looking outward from the inside of the vehicle.

Figure 1:
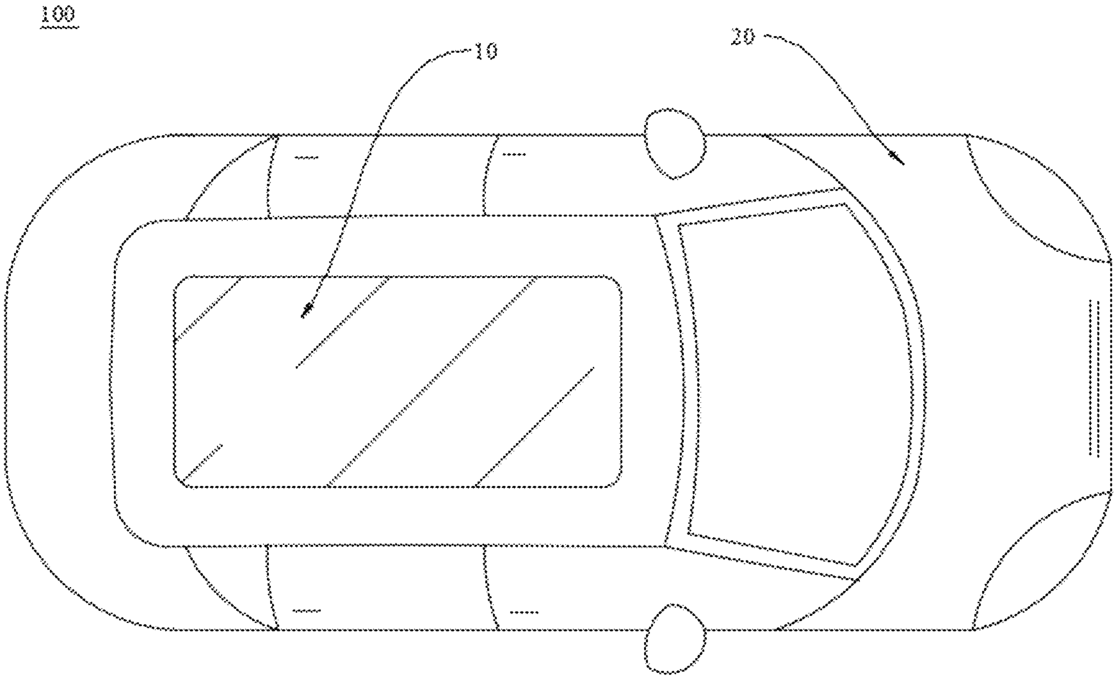
FIG. 1 is a schematic structural view of a vehicle employing sunroof glass provided in embodiments of the present disclosure.

Referring to FIG. 1, a vehicle 100 includes sunroof glass 10 and a vehicle body 20. The sunroof glass 10 is connected to the vehicle body 20. Exemplarily, the sunroof glass 10 may be panoramic sunroof glass. A visible-light transmittance of the sunroof glass 10 may be less than or equal to 30%, preferably less than or equal to 20%, and specifically, such as, 19%, 18%, 17%, 16%, 15%, 14%, 13%, 12%, 11%, 10%, 9%, 8%, 7%, 6%, 5%, 4%, 3%, 2%, 1%. A visible-light reflectivity of the sunroof glass 10 measured from the inside of the vehicle is less than or equal to 4%, preferably less than or equal to 3%, and more preferably less than or equal to 2%.

Figure 2:
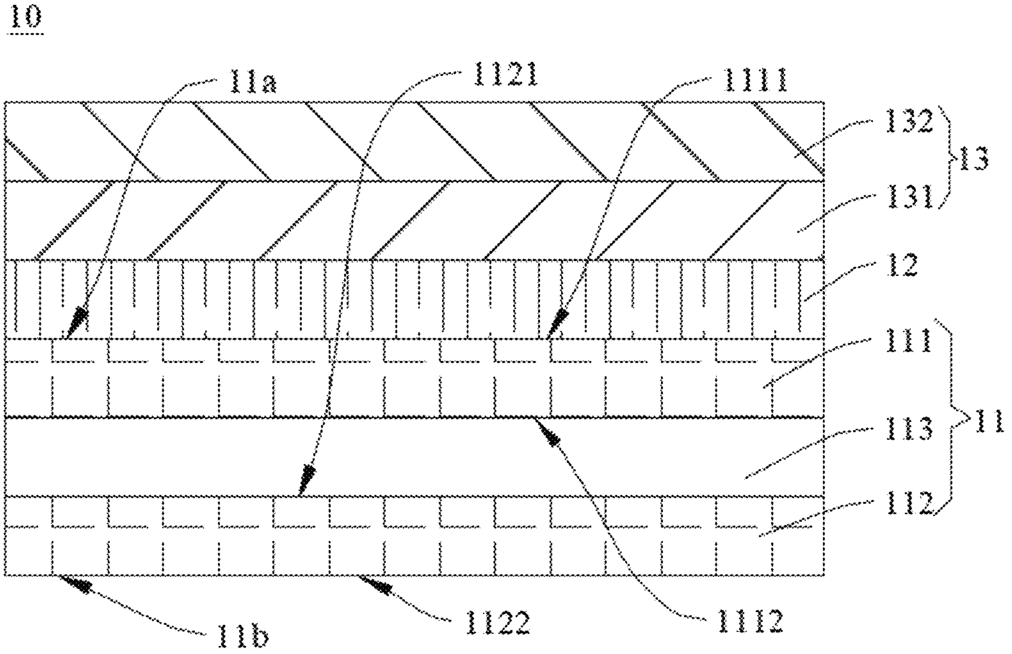
FIG. 2 is a schematic structural view of sunroof glass provided in embodiments of the present disclosure.

Referring to FIG. 2, the sunroof glass 10 includes a glass substrate 11, a metal absorption layer 12, and an anti-reflective layer 13. The metal absorption layer 12 and the anti-reflective layer 13 are sequentially stacked on the glass substrate 11.

It may be noted that, FIG. 2 aims to schematically describe the connection relationship between the glass substrate 11, the metal absorption layer 12, and the anti-reflective layer 13, and is not intended to specifically limit the connection position, specific configuration, and quantity of each device. The schematic structure of embodiments of the present disclosure does not constitute a specific limitation to the sunroof glass 10. In other embodiments of the present disclosure, the sunroof glass 10 may include more or fewer components than illustrated in FIG. 2, or combine or split certain components, or have different component arrangements. The components illustrated in FIG. 2 may be implemented in hardware, software, or a combination of software and hardware.

Referring to FIG. 2 again, the glass substrate 11 has an inner surface 11*a* and an outer surface 11*b* opposite to the inner surface 11*a*. The inner surface 11*a* is a surface of the glass substrate 11 facing the inside of the vehicle. The outer surface 11*b* is a surface of the glass substrate 11 facing the outside of the vehicle. The metal absorption layer 12 and the anti-reflective layer 13 are sequentially stacked on the inner surface 11*a* in a direction away from the glass substrate 11.

The glass substrate 11 may be transparent or tinted. The glass substrate 11 may be made of soda-lime silicate glass, borosilicate glass, aluminosilicate glass, or organic glass. The organic glass may be, such as, polymethyl methacrylate or polycarbonate.

It may be noted that the glass substrate 11 used as the sunroof glass 10 is generally in a curved shape. The shape of the glass substrate 11 is not limited to the shape described above, and may be any shape that meets the usage requirements of the sunroof glass 10. For example, the glass substrate 11 may also be in a flat plate shape. The embodiments of the present disclosure do not impose strict requirements on the shape of the glass substrate 11.

The glass substrate 11 may be one sheet of tempered glass. A thickness of the tempered glass is greater than or equal to 5 mm, such as, 5.1 mm, 5.5 mm, 5.8 mm, 6 mm, 6.5 mm, 7 mm, 7.5 mm, 8 mm, etc. The tempered glass may be tinted glass. A total iron content of the tinted glass measured by $Fe_2O_3$ ranges from 0.5% to 2.0%, such as, green glass, blue glass, grey glass, etc.

Referring to FIG. 2 again, the glass substrate 11 may be laminated glass. The laminated glass includes inner glass 111, outer glass 112, and an interlayer 113 disposed between the outer glass 112 and the inner glass 111. The inner glass 111 has a first surface 1111 and a second surface 1112 opposite to the first surface 1111. The first surface 1111 is the inner surface 11*a* of the glass substrate 11. The outer glass 112 has a third surface 1121 and a fourth surface 1122 opposite to the third surface 1121. The fourth surface 1122 is the outer surface 11*b* of the glass substrate 11.

It can be understood that the interlayer 113 is disposed between the outer glass 112 and the inner glass 111, for example, the interlayer 113 is used to connect the outer glass 112 and the inner glass 111, so that the whole sunroof glass 10 has a laminated structure as a whole. Therefore, the strength of the glass body is improved, the glass body is not easy to be broken, and the impact-resistance performance is improved compared to single-layer glass. Thanks to the improvement of the impact-resistance performance, the safety performance of the vehicle can be improved, and the glass body is not easy to be damaged, reducing the maintenance cost.

Figure 10:
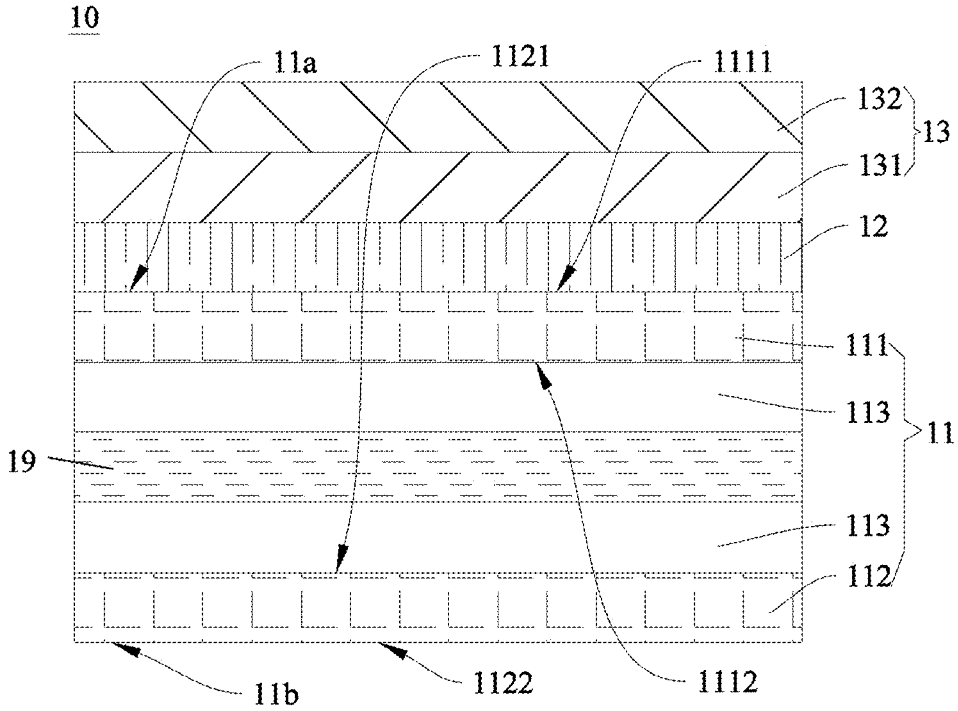
FIG. 10 is a structural schematic view of sunroof glass provided in other embodiments of the present disclosure.

Referring to FIG. 10, the sunroof glass 10 further includes a dimming element 19. The dimming element 19 is disposed between the second surface 1112 and the third surface 1121. The dimming element 19 may include one or more of a polymer dispersed liquid crystal (PDLC) dimming film, a polymer network liquid crystal (PNLC) dimming film, a suspended particle device (SPD) dimming film, or an electrochromic (EC) dimming film.

Figure 3:
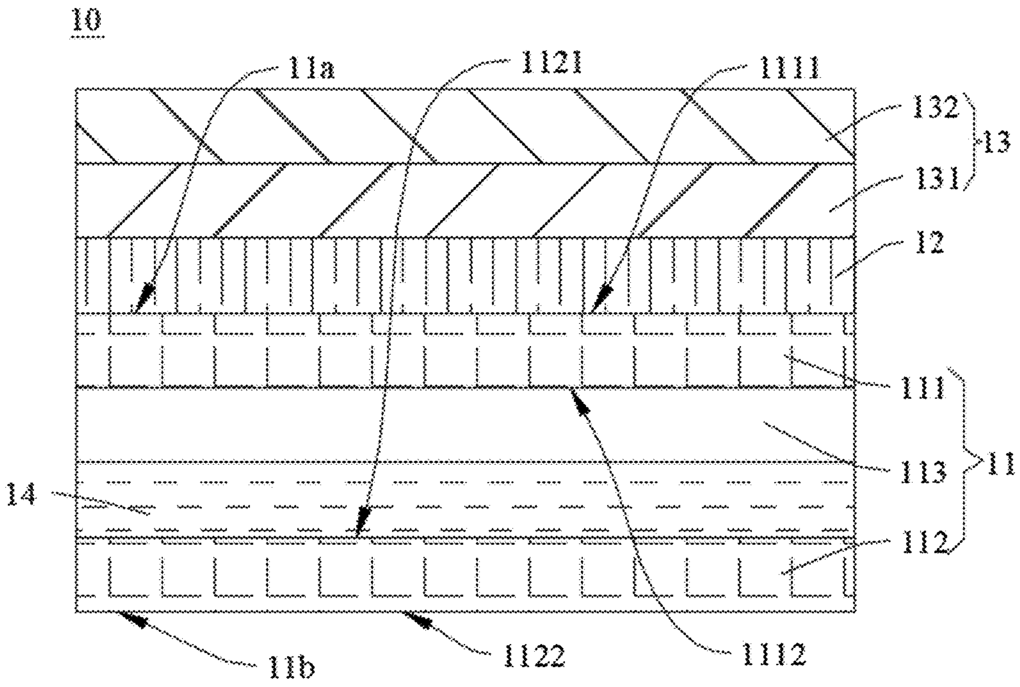
FIG. 3 is a structural schematic view of sunroof glass provided in other embodiments of the present disclosure.

Referring to FIG. 3, in a possible implementation, the glass substrate 11 may further include at least one infrared reflecting layer 14. The at least one infrared reflecting layer 14 is disposed on the second surface 1112 of the inner glass 111 and/or the third surface 1121 of the outer glass 112.

It can be understood that, the at least one infrared reflecting layer 14 is disposed between the outer glass 112 and the interlayer 113 and/or between the inner glass 111 and the interlayer 113. The infrared reflecting layer 14 includes at least one metallic functional layer and multiple dielectric layers. For example, the metallic functional layer may be a gold layer, a silver layer, a copper layer, a silver-copper alloy layer, a silver-indium alloy layer, a silver-gold alloy layer, and the like. More specifically, the infrared reflecting layer 14 may be a single-silver coating (including one silver layer), a double-silver coating (including two silver layers), a triple-silver coating (including three silver layers), a four-silver coating (including four silver layers), or the like. The infrared reflecting layer 14 can reflect most infrared rays with a wavelength range of 780 nm-2500 nm, so that the sunroof glass 10 has a sun-protection and heat-insulation performance. Therefore, the thermal comfort inside the vehicle is improved, and the sunroof glass 10 can adapt to the development trend of the panoramic glass.

In a possible implementation, the outer glass 112 and the inner glass 111 are arranged in parallel. In this arrangement, the thickness of the interlayer 113 is even.

In another possible implementation, an extension direction of the outer glass 112 intersects with an extension direction of the inner glass 111. In this arrangement, the thickness of the interlayer 113 is uneven, and the interlayer 113 may present a structure arrangement having a gradient in thickness. For example, the interlayer 113 may be wedge-shaped.

Based on the foregoing description, it may be understood that the thickness of the interlayer 113 can be flexibly adjusted according to an actual application scenario of the sunroof glass 10, which is beneficial to adapting to multi-scenario application requirements of the sunroof glass 10.

Exemplarily, the inner glass 111 and the outer glass 112 each may be transparent glass (e.g., clear glass) with the thickness of 2.1 mm. Specifically, as long as each of the thickness of the inner glass 111 and the thickness of the outer glass 112 ranges from 0.7 mm to 4.0 mm (both inclusive), the requirements are complied with. In order to meet the requirements of light weight, preferably, the thickness of the outer glass 112 ranges from 1.6 mm to 4.0 mm, the thickness of the inner glass 111 ranges from 0.7 mm to 2.1 mm, and the thickness of the outer glass 112 is greater than or equal to the thickness of the inner glass 111. The visible-light transmittance of the outer glass 112 is greater than or equal to 70%, preferably greater than or equal to 80%, and even greater than or equal to 90%. The visible-light transmittance of the inner glass 111 is greater than or equal to 70%, preferably greater than or equal to 80%, and even greater than or equal to 90%. The inner glass 111 and the outer glass 112 are clear glass, so that the product cost can be greatly reduced and the market competitiveness of the product can be improved.

In a possible implementation, the visible-light transmittance of the sunroof glass 10 is adjusted by selecting interlayers 113 having different visible-light transmittances. Preferably, the visible-light transmittance of the interlayer 113 ranges from 1% to 30%, such as, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, etc. The interlayer 113 may be made of polyvinyl butyral (PVB), ethylene vinyl acetate (EVA), an ionized polymer film (e.g., SentryGlass® Plus (SGP)), etc.

In another possible implementation, the outer glass 112 has a visible-light transmittance of less than or equal to 50%, preferably less than or equal to 40%, more preferably less than or equal to 30%, and even less than or equal to 20%. The inner glass 111 has a visible-light transmittance less than or equal to 50%, preferably less than or equal to 40%, more preferably less than or equal to 30%, and even less than or equal to 20%. The interlayer 113 has a visible-light transmittance greater than or equal to 70%. Specifically, the visible-light transmittance of the interlayer 113 may be, such as, greater than or equal to 70%, greater than or equal to 75%, greater than or equal to 80%, greater than or equal to 85%, greater than or equal to 90%, etc. By employing a common transparent interlayer, such as standard transparent PVB, the product cost can be greatly reduced, and the market competitiveness of the product can be improved.

Referring to FIG. 2, the metal absorption layer 12 is connected to the first surface 1111 of the inner glass 111. It can be understood that by disposing the metal absorption layer 12 on the glass substrate 11, the following effects can be realized. On the one hand, the absorption of light can be adjusted with aid of the metal absorption layer 12, thereby improving the emissivity performance and appearance color of the sunroof glass 10. On the other hand, the metal absorption layer 12 can absorb visible light to a certain extent, thereby reducing the visible-light reflectivity of the inner surface 11*a* of the glass substrate 11 facing the inside of the vehicle. Therefore, the user can better see the outside through the sunroof, and the influence of light reflected by the inner surface 11*a* of the glass substrate 11 on the user inside the vehicle is reduced, thereby improving the use experience of the user.

Exemplarily, the metal absorption layer 12 may be a metal coating. The metal absorption layer 12 may be made of a combination of one or more of nickel (Ni), chromium (Cr), iron (Fe), titanium (Ti), molybdenum (Mo), zirconium (Zr), silicon (Si), or niobium (Nb). The thickness of the metal absorption layer 12 may range from 1 nm to 15 nm, preferably from 3 nm to 12 nm, and more preferably from 5 nm to 10 nm. The metal absorption layer 12 with an appropriate thickness cannot only absorb visible light, but also cooperate with the anti-reflective layer 13 to further reduce the visible-light reflectivity of the glass substrate 11.

Referring to FIG. 2 again, the anti-reflective layer 13 is disposed at one side of the metal absorption layer 12 away from the inner glass 111. For example, the anti-reflective layer 13 may be formed by coating using a magnetron sputtering process. It can be understood that the anti-reflective layer 13 can reduce the visible-light reflectivity of the glass substrate 11. The anti-reflective layer 13 and the metal absorption layer 12 cooperate with each other to further reduce the visible-light reflectivity of the inner surface 11*a* of the glass substrate 11, so that the sunroof glass 10 can adapt to the application trend of panoramic glass.

In addition, the cooperation of the anti-reflective layer 13 and the metal absorption layer 12 can greatly reduce the visible-light reflectivity of the inner surface 11*a* of the glass substrate 11, therefore the mirror effect of the sunroof glass 10 when viewed from the inside of the vehicle can be eliminated, and the user experience can be improved.

In embodiments of the present disclosure, the anti-reflective layer 13 includes at least one stacking including a high refractive-index layer 131 and a low refractive-index layer 132. The high refractive-index layer 131 is connected to the metal absorption layer 12. The low refractive-index layer 132 is connected to the high refractive-index layer 131 and is away from the metal absorption layer 12. A refractive index of the high refractive-index layer 131 is greater than or equal to 1.7. A refractive index of the low refractive-index layer 132 is less than 1.7.

The stacking of high refractive-index layer 131 and low refractive-index layer 132 is formed by the high refractive-index layer 131 and the low refractive-index layer 132 which are sequentially stacked. For example, one stacking of high refractive-index layer 131 and low refractive-index layer 132 includes a high refractive-index layer 131 and a low refractive-index layer 132 in sequence. Two stackings of high refractive-index layer 131 and low refractive-index layer 132 include a high refractive-index layer 131, a low refractive-index layer 132, a high refractive-index layer 131, and a low refractive-index layer 132 in sequence. Three stackings of high refractive-index layer 131 and low refractive-index layer 132 include a high refractive-index layer 131, a low refractive-index layer 132, a high refractive-index layer 131, a low refractive-index layer 132, a high refractive-index layer 131, and a low refractive-index layer 132 in sequence. The thickness of the high refractive-index layer 131 may range from 1 nm to 70 nm (both inclusive). In a specific application scenario, the high refractive-index layer 131 may further include at least two high refractive-index sub-layers. For example, the stacking of high refractive-index layer 131 and low refractive-index layer 132 may be specifically a first high refractive-index sub-layer, a second high refractive-index sub-layer, and the low refractive-index layer 132. A refractive index of the first high refractive-index sub-layer is less than a refractive index of the second high refractive-index sub-layer. The thickness of the low refractive-index layer 132 may range from 20 nm to 150 nm (both inclusive).

Exemplarily, a refractive index of the high refractive-index layer 131 may range from 1.7 to 2.5 (both inclusive). A refractive index of the low refractive-index layer 132 may range from 1.4 to 1.69 (both inclusive). The high refractive-index layer 131 may be made of an oxide or an alloy oxide of zinc (Zn), tin (Sn), Nb, Ti, Ni, Cr, and tantalum (Ta), such as zinc tin oxide ($ZnSnO_x$), titanium oxide ($TiO_x$), niobium oxide ($NbO_x$), etc. Alternatively, the high refractive-index layer 131 may be made of a nitride or an alloy nitride of Si, Zr, and aluminium (Al), such as silicon nitride ($SiN_x$), silicon-based aluminum nitride ($SiAlN_x$), silicon-based zirconium nitride ($SiZrN_x$), etc. The low refractive-index layer 132 may be made of an oxide or an alloy oxide of Si, Zr, and Al, such as silicon oxide ($SiO_x$), silicon-based aluminum oxide ($SiAlO_x$), silicon-based zirconium oxide ($SiZrO_x$), etc. The value of x is determined according to the stoichiometry, sub-stoichiometry, or super-stoichiometry in the magnetron sputtering process.

Referring to FIG. 2 to FIG. 9, the anti-reflective layer 13 may include a stacking of high refractive-index layer 131 and low refractive-index layer 132, or may include at least two stackings of high refractive-index layer 131 and low refractive-index layer 132. Specifically, the anti-reflective layer 13 may include two stackings, three stackings, four stackings, or the like. Based on considerations such as obvious advantages in the manufacturing process and cost, preferably, the anti-reflective layer 13 includes only one stacking of high refractive-index layer 131 and low refractive-index layer 132. In embodiments of the present disclosure, due to the cooperation of the metal absorption layer 12 and the anti-reflective layer 13, an anti-reflective effect of the anti-reflective layer 13 including only one stacking can achieve the same level of an anti-reflective effect of the conventional anti-reflective layer including two stackings, three stackings, or even four stackings.

In a specific application scenario, as illustrated in FIG. 2, FIG. 3, FIG. 6, FIG. 7, FIG. 8, and FIG. 9, the anti-reflective layer 13 includes only one stacking of high refractive-index layer 131 and low refractive-index layer 132, and the stacking is arranged in a structure of the high refractive-index layer 131—the low refractive-index layer 132 in a direction from the inner surface 11*a* of the glass substrate 11 toward the inside of the vehicle. Specifically, in a direction away from the inner surface 11*a*, the anti-reflective layer 13 includes the high refractive-index layer 131 and the low refractive-index layer 132 that are sequentially stacked at one side of the metal absorption layer 12 away from the inner glass 111.

Figure 4:
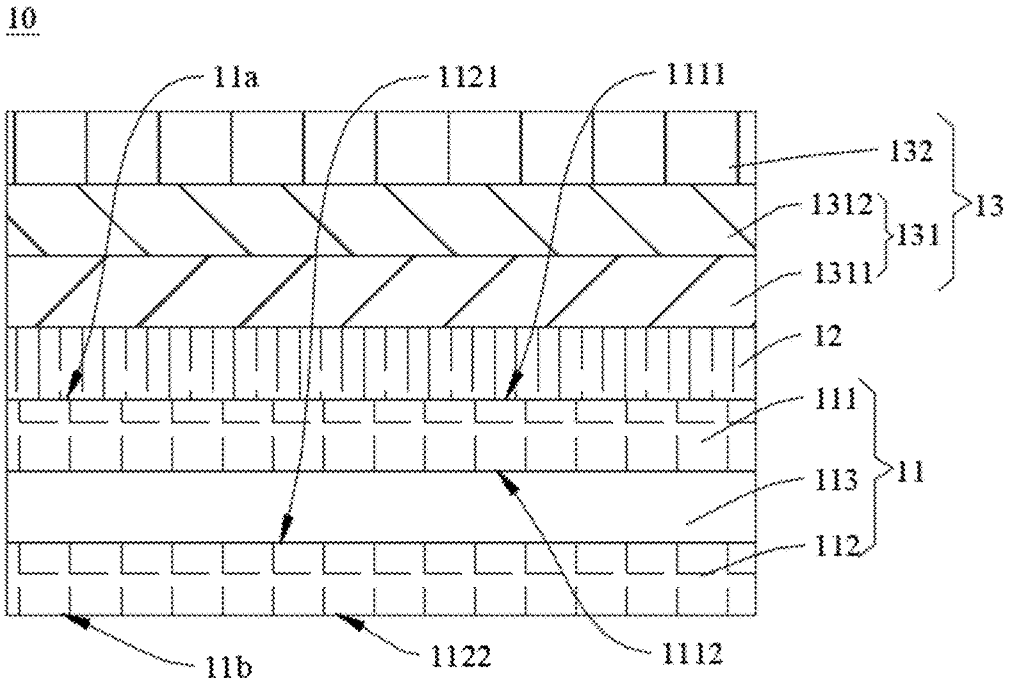
FIG. 4 is a structural schematic view of sunroof glass provided in other embodiments of the present disclosure.

In another specific application scenario, the high refractive-index layer 131 in the anti-reflective layer 13 includes two high refractive-index sub-layers, and the anti-reflective layer 13 is arranged in a structure of a first high refractive-index sub-layer 1311—a second high refractive-index sub-layer 1312—the low refractive-index sub-layer 132 in a direction away from the inner surface 11*a* of the inner glass 111. Specifically, as illustrated in FIG. 4, in the direction away from the inner surface 11*a* of the inner glass 111, the stacking structure includes the first high refractive-index sub-layer 1311, the second high refractive-index sub-layer 1312, and the low refractive-index layer 132 sequentially stacked at one side of the metal absorption layer 12 away from the inner glass 111. A refractive index of the first high refractive-index sub-layer 1311 is less than a refractive index of the second high refractive-index sub-layer 1312.

Figure 5:
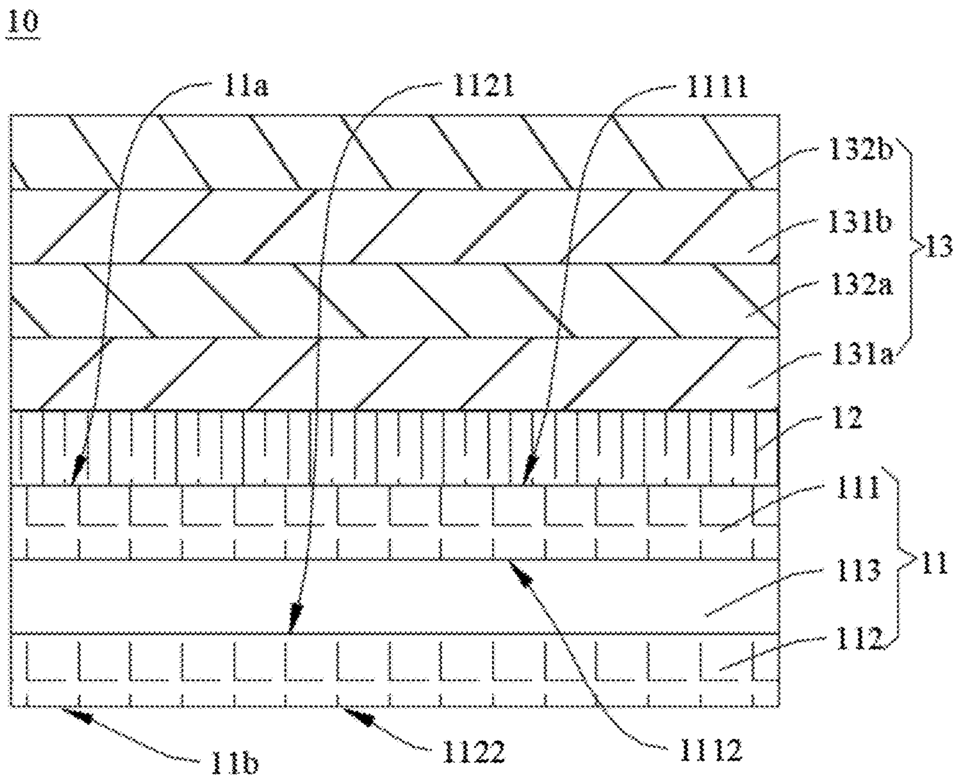
FIG. 5 is a structural schematic view of sunroof glass provided in other embodiments of the present disclosure.

In yet another specific application scenario, the anti-reflective layer 13 includes two stackings of high refractive-index layer 131 and low refractive-index layer 132, and the two stackings are in a structure in which the high refractive-index layer 131 and the low refractive-index layer 132 are periodically and alternately arranged in the direction away from the inner surface 11*a* of the inner glass 111, where the outermost layer (i.e., the layer farthest from the first surface 1111 of the inner glass 111) is the low refractive-index layer 132. Specifically, as illustrated in FIG. 5, the anti-reflective layer 13 includes a first high refractive-index layer 131*a*, a first low refractive-index layer 132*a*, a second high refractive-index layer 131*b*, and a second low refractive-index layer 132*b* sequentially stacked on the inner glass 111. The material of the first high refractive-index layer 131*a* may be the same as or different from the material of the second high refractive-index layer 131*b*. The thickness of the first high refractive-index layer 131*a* may be the same as or different from the thickness of the second high refractive-index layer 131*b*. The material of the first low refractive-index layer 132*a* may be the same as or different from the material of the second low refractive-index layer 132*b*. The thickness of the first low refractive-index layer 132*a* may be the same as or different from the thickness of the second low refractive-index layer 132*b*.

In embodiments of the present disclosure, by using a suitable glass substrate 11, and adjusting the material and thickness of the metal absorption layer 12 and the material and thickness of the anti-reflective layer 13, a reflected color of the sunroof glass 10 measured from the inner surface 11*a* has a value of a ranging from −6 to 2 (both inclusive) and a value of b ranging from −12 to 0 (both inclusive) in a color space Lab. Therefore, the color of the sunroof glass 10 viewed from the inside of the vehicle is preferably a neutral color, so that the passenger can enjoy a better visual effect inside the vehicle.

Figure 6:
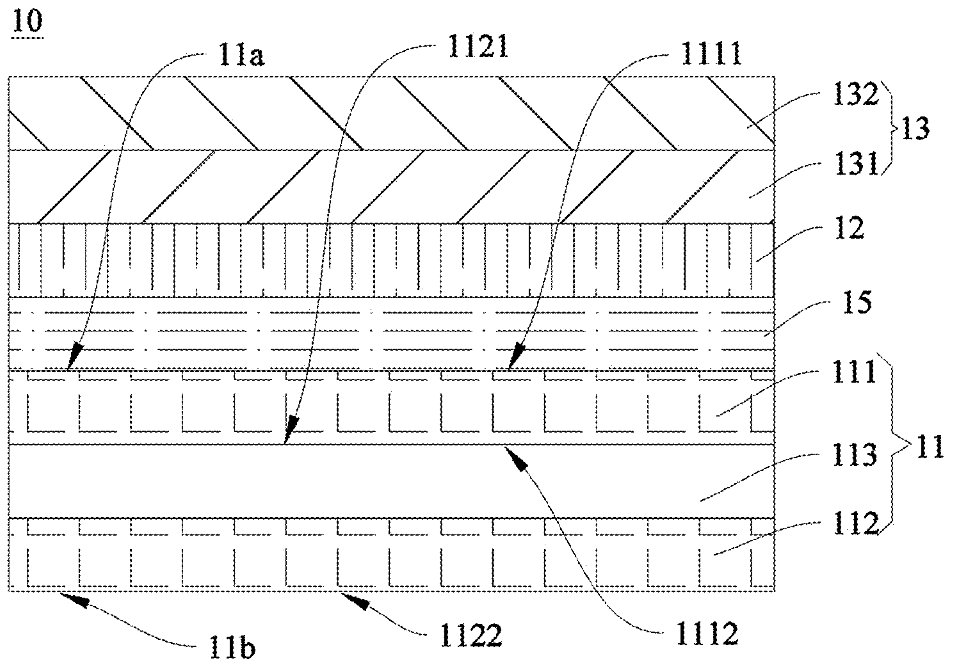
FIG. 6 is a structural schematic view of sunroof glass provided in other embodiments of the present disclosure.

In a possible implementation, as illustrated in FIG. 6, the sunroof glass 10 may further include a first protective layer 15. The first protective layer 15 is directly disposed on the first surface 1111 of the inner glass 111. In other words, the first protective layer 15 is disposed between the inner surface 11*a* of the glass substrate 11 and the metal absorption layer 12. The first protective layer 15 can prevent the metal absorption layer 12 from being damaged and oxidized due to diffusion of alkali metal ions and oxygen through the surface of the inner glass 111, during bending of the inner glass 111 at a high temperature of at least 500° C.

Exemplarily, the thickness of the first protective layer 15 may be greater than or equal to 5 nm. The first protective layer 15 may be made of an oxide or an alloy oxide of Zn, Sn, Ti, Si, Al, Nb, Zr, Ni, magnesium (Mg), Cr, Ta, etc., or may be made of a nitride or an alloy oxynitride of Si, Al, Zr, boron (B), Ti, etc. The alloy oxide refers to an oxide of at least two elements. The alloy oxynitride refers to an oxynitride of at least two elements.

Figure 7:
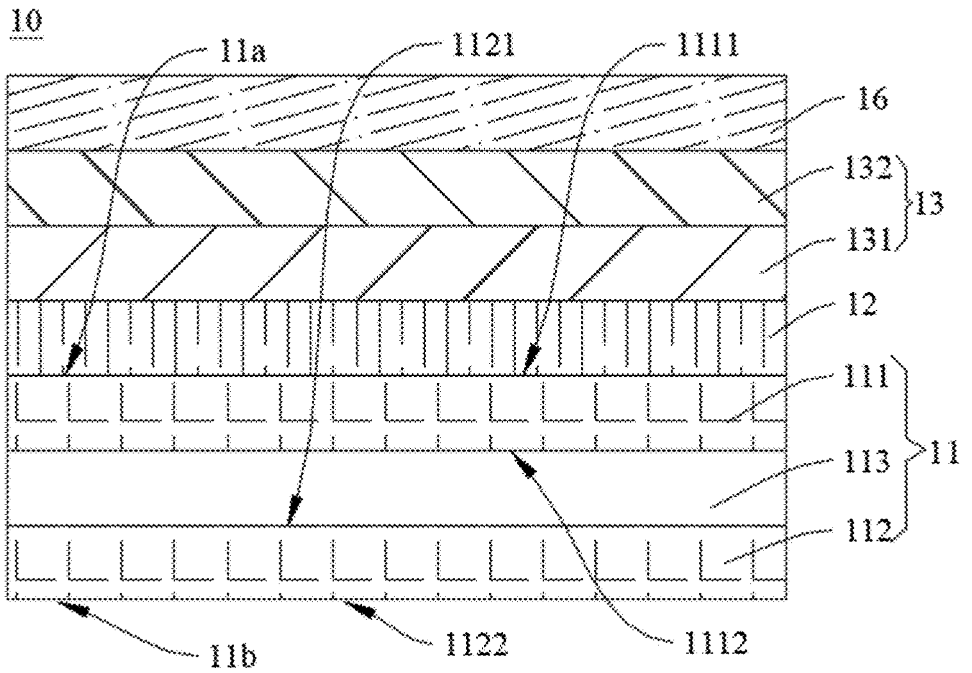
FIG. 7 is a structural schematic view of sunroof glass provided in other embodiments of the present disclosure.

In another possible implementation, as illustrated in FIG. 7, the sunroof glass 10 may further include a second protective layer 16 disposed at one side of the anti-reflective layer 13 away from the metal absorption layer 12. In other words, the second protective layer 16 is disposed on the outermost layer of the coating structure of the sunroof glass 10. The second protective layer 16 contributes to further improvement of the overall mechanical stability and thermal stability of the coating.

Exemplarily, the second protective layer 16 may be made of a nitride or an alloy oxynitride of Si, Al, Zr, Ti, B, Ni, etc., such as, $SiN_x$, $SiAlN_x$, $SiZrN_x$, etc. The thickness of the second protective layer 16 is greater than or equal to 3 nm. Considering the influence of the second protective layer 16 on the anti-reflective layer 13, preferably, the thickness of the second protective layer 16 is less than or equal to 30 nm. More preferably, the thickness of the second protective layer 16 ranges from 5 nm to 20 nm.

Figure 8:
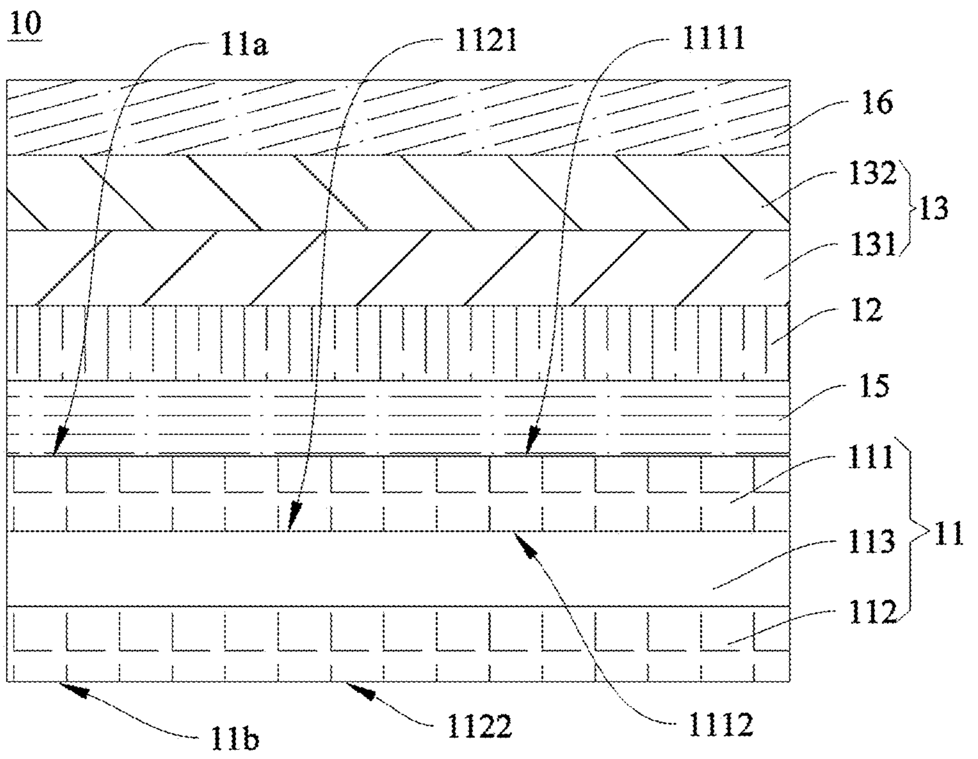
FIG. 8 is a structural schematic view of sunroof glass provided in other embodiments of the present disclosure.

In another possible implementation, as illustrated in FIG. 8, the sunroof glass 10 may further include a first protective layer 15 and a second protective layer 16. The first protective layer 15 is disposed between the metal absorption layer 12 and the inner glass 111. The second protective layer 16 is disposed on a surface of the anti-reflective layer 13 away from the metal absorption layer 12.

It may be noted that not only can the color of the sunroof glass 10 be adjusted by adjusting the material and the thickness of the metal absorption layer 12 and the material and the thickness of the anti-reflective layer 13, but also the color of the sunroof glass 10 can be adjusted by adjusting the material and the thickness of the first protective layer 15 and the material and the thickness of the second protective layer 16, which is not strictly limited in embodiments of the present disclosure.

Figure 9:
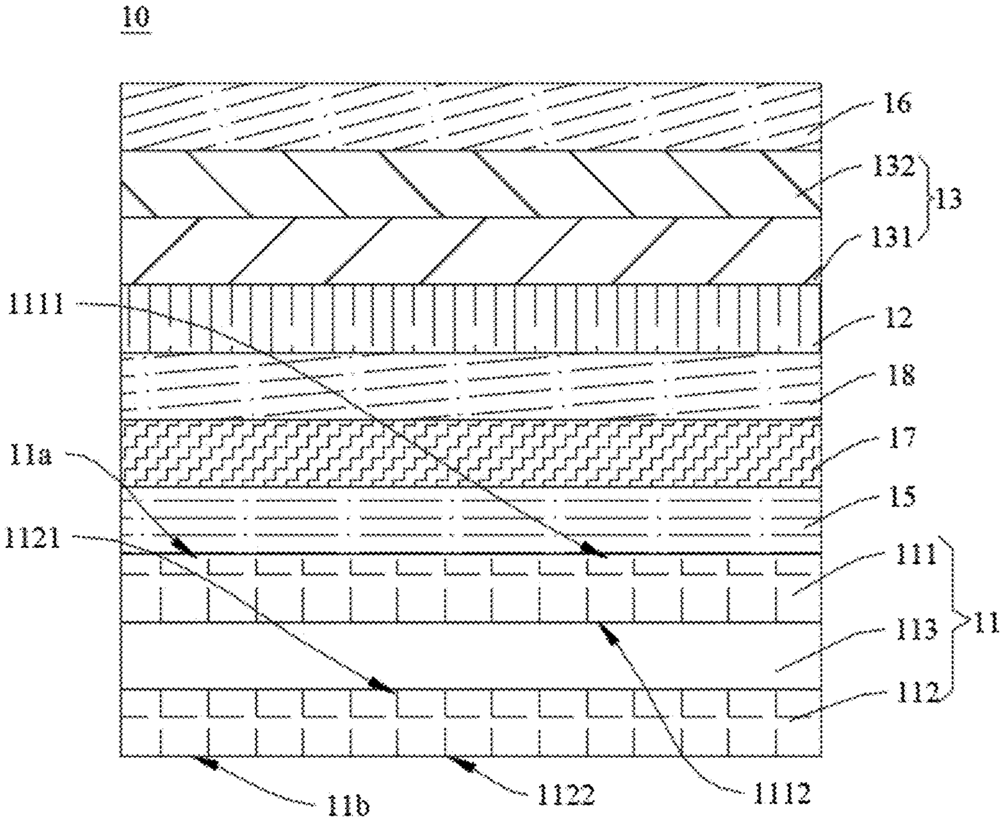
FIG. 9 is a structural schematic view of sunroof glass provided in other embodiments of the present disclosure.

Referring to FIG. 9, in embodiments of the present disclosure, the sunroof glass 10 may further include a low-emissivity layer 17 disposed between the first protective layer 15 and the metal absorption layer 12. The low-emissivity layer 17 is configured to reduce emissivity of the sunroof glass 10 measured from the inner surface 11*a*. The emissivity of the sunroof glass 10 measured from the inner surface 11*a* ranges from 0.01 to 0.25 (both inclusive). Therefore, the heat transfer between the inside of the vehicle and the outside of the vehicle can be better blocked. The low-emissivity layer 17 includes one or more of an indium tin oxide (ITO) layer, a fluorine-doped tin oxide (FTO) layer, an antimony tin oxide (ATO) layer, or an aluminum-doped zinc oxide (AZO) layer. A barrier layer 18 is further disposed between the low-emissivity layer 17 and the metal absorption layer 12. The first protective layer 15, the low-emissivity layer 17, the barrier layer 18, the metal absorption layer 12, the high refractive-index layer 131, the low refractive-index layer 132, and the second protective layer 16 may be sequentially disposed on the first surface 1111.

Specifically, the first protective layer 15 may be directly disposed on the first surface 1111. The low-emissivity layer 17 is disposed at one side of the first protective layer 15 away from the inner glass 111. The barrier layer 18 is disposed at one side of the low-emissivity layer 17 away from the first protective layer 15. It can be understood that the first protective layer 15 is disposed on the surface of the inner glass 111, so that alkali metal ions and the like in the inner glass 11 can be blocked from entering the coating structure, thereby protecting the layers between the first protective layer 15 and the second protective layer 16. The low-emissivity layer 17 is disposed at one side of the first protective layer 15 away from the glass substrate 11, so that the sunroof glass 10 has an excellent low-emissivity effect. The barrier layer 18 is disposed at one side of the low-emissivity layer 17 away from the first protective layer 15, so that due to the arrangement of the barrier layer 18 between the metal absorption layer 12 and the low-emissivity layer 17, performance degradation or even failure of the metal absorption layer 12 or the low-emissivity layer 17 caused by mutual influence of the metal absorption layer 12 and the low-emissivity layer 17 can be prevented.

A method for manufacturing sunroof glass 10 is further provided in the present disclosure. The specific structure of the sunroof glass 10 can refer to FIG. 1 to FIG. 9 and the description above. In addition, descriptions of improvements of the sunroof glass 10 in following method all can be applied to the descriptions of the sunroof glass 10 above without conflict. The method includes the following.

S100, inner glass 111 is provided, where the inner glass 111 has a first surface 1111 and a second surface 1112 opposite to the first surface 1111.

S200, a metal absorption layer 12 and an anti-reflective layer 13 are sequentially stacked on the first surface 1111 of the inner glass 111.

S300, a glass substrate 11 is prepared, where the glass substrate 11 includes inner glass 111, outer glass 112, and an interlayer 113 connected between the inner glass 111 and the outer glass 112, and an inner surface 11*a* of the glass substrate 11 is the first surface 1111 of the inner glass 111.

Specifically, S200 and S300 are described as follows.

S200, the metal absorption layer 12 and the anti-reflective layer 13 are sequentially stacked on the first surface 1111 of the inner glass 111.

First, the metal absorption layer 12 and the anti-reflective layer 13 are deposited on the first surface 1111 by a magnetron sputtering process.

Exemplarily, a first protective layer 15, a low-emissivity layer 17, a barrier layer 18, a metal absorption layer 12, a high refractive-index layer 131, a low refractive-index layer 132, and a second protective layer 16 are respectively deposited and stacked on the first surface 1111 of the inner glass 111 in sequence by means of the magnetron sputtering.

S300, the glass substrate 11 is prepared.

The glass substrate 11 includes the inner glass 111, the outer glass 112, and the interlayer 113 connected between the inner glass 111 and the outer glass 112. The inner surface 11*a* of the glass substrate 11 is the first surface 1111 of the inner glass 111. After the metal absorption layer 12 and the anti-reflective layer 13 are deposited on the inner glass 111 by means of the magnetron sputtering, the first protective layer 15, the low-emissivity layer 17, the barrier layer 18, the second protective layer 16, and the like may be further deposited, and an infrared reflecting layer 14 may be further deposited on the third surface 1121 of the outer glass 112. A high-temperature bending treatment is performed on the outer glass 112 and the inner glass 111. The temperature range of the high-temperature bending treatment may range from 550° C. to 700° C. (both inclusive). Then the outer glass 112 and the inner glass 111 are connected by the interlayer 113, a visible-light transmittance of the interlayer 113 may range from 1% to 30%. The outer glass 112, the inner glass 111, and the interlayer 113 are formed into a laminated glass structure by a vehicle-glass production process.

Six examples and four comparative examples are further provided in the present disclosure to analyze and study the performance of the sunroof glass 10.

Example 1

Outer glass 112 and inner glass 111 each are clear glass with the thickness of 2.1 mm. A first protective layer 15 (a $Si_3N_4$ layer with the thickness of 10 nm), a metal absorption layer 12 (a NiCr layer with the thickness of 6.5 nm), a high refractive-index layer (a $TiO_2$ layer with the thickness of 26 nm), and a low refractive-index layer (a $SiO_2$ layer with the thickness of 36 nm) are sequentially deposited on a first surface 1111 of the inner glass 111 by means of magnetron sputtering. The $TiO_2$ layer with the thickness of 26 nm and the $SiO_2$ layer with the thickness of 36 nm constitute an anti-reflective layer 13. After the deposition of the coating is finished, a high-temperature bending treatment is performed on the outer glass 112 and the inner glass 111. Then grey PVB with the thickness of 0.76 mm and a visible-light transmittance of about 10% is prepared as an interlayer 113. Finally, a laminated glass structure is formed by a vehicle-glass production process.

Example 2

The outer glass 112 and the inner glass 111 each are clear glass with the thickness of 2.1 mm. The metal absorption layer 12 (the NiCr layer with the thickness of 6.5 nm), the high refractive-index layer (the $TiO_2$ layer with the thickness of 26 nm), the low refractive-index layer (the $SiO_2$ layer with the thickness of 32 nm), a second protective layer 16 (a $Si_3N_4$ layer with the thickness of 15 nm) are sequentially deposited on a first surface 1111 of the inner glass 11 by mean of the magnetron sputtering. The $TiO_2$ layer with the thickness of 26 nm and the $SiO_2$ layer with the thickness of 32 nm constitute the anti-reflective layer 13. After the deposition of the coating is finished, the high-temperature bending treatment is performed on the outer glass 112 and the inner glass 111. Then the PVB with the thickness of 0.76 mm and the visible-light transmittance of about 10% is prepared as the interlayer 113. Finally, the laminated glass structure is formed by the vehicle-glass production process.

Example 3

The outer glass 112 and the inner glass 111 each are clear glass with the thickness of 2.1 mm. The first protective layer 15 (the $Si_3N_4$ layer with the thickness of 10 nm), the metal absorption layer 12 (the NiCr layer with the thickness of 6.5 nm), the high refractive-index layer (the $TiO_2$ layer with the thickness of 26 nm), the low refractive-index layer (the $SiO_2$ layer with the thickness of 34 nm), and the second protective layer 16 (the $Si_3N_4$ layer with the thickness of 15 nm) are sequentially deposited on a first surface 1111 of the inner glass 111 by means of the magnetron sputtering. The $TiO_2$ layer with the thickness of 26 nm and the $SiO_2$ layer with the thickness of 34 nm constitute the anti-reflective layer 13. After the deposition of the coating is finished, the high-temperature bending treatment is performed on the outer glass 112 and the inner glass 111. Then, the PVB with the thickness of 0.76 mm and the visible-light transmittance of about 10% is prepared as the interlayer 113. Finally, the laminated glass structure is formed by the vehicle-glass production process.

Example 4

The outer glass 112 and the inner glass 111 each are clear glass with the thickness of 2.1 mm. The first protective layer 15 (a $ZnSnO_x$ layer with the thickness of 10 nm), the metal absorption layer 12 (the NiCr layer with the thickness of 6.5 nm), the high refractive-index layer (the $TiO_2$ layer with the thickness of 26 nm), the low refractive-index layer (the $SiO_2$ layer with the thickness of 34 nm), and the second protective layer 16 (the $Si_3N_4$ layer with the thickness of 15 nm) are sequentially deposited on the first surface 1111 of the inner glass 111 by means of the magnetron sputtering. The $TiO_2$ layer with the thickness of 26 nm and the $SiO_2$ layer with the thickness of 34 nm constitute the anti-reflective layer 13. After the deposition of the coating is finished, the high-temperature bending treatment is performed on the outer glass 112 and the inner glass 111. Then the PVB with the thickness of 0.76 mm and the visible-light transmittance of about 10% is prepared as the interlayer 113. Finally, the laminated glass structure is formed by the vehicle-glass production process.

Example 5

The outer glass 112 and the inner glass 111 each are clear glass with the thickness of 2.1 mm. The first protective layer 15 (the $Si_3N_4$ layer with the thickness of 10 nm), a low-emissivity layer 17 (a ITO layer with the thickness of 138 nm), a barrier layer 18 (a $Si_3N_4$ layer with the thickness of 10 nm), the metal absorption layer 12 (the NiCr layer with the thickness of 8.5 nm), the high refractive-index layer (the $TiO_2$ layer with the thickness of 34 nm), the low refractive-index layer (the $SiO_2$ layer with the thickness of 63 nm), and the second protective layer 16 (the $Si_3N_4$ layer with the thickness of 10 nm) are sequentially deposited on the first surface 1111 of the inner glass 111 by means of the magnetron sputtering. The $TiO_2$ layer with the thickness of 34 nm and the $SiO_2$ layer with the thickness of 63 nm constitute the anti-reflective layer 13. After the deposition of the coating is finished, the high-temperature bending treatment is performed on the outer glass 112 and the inner glass 111. Then the PVB with the thickness of 0.76 mm and the visible-light transmittance of about 10% is prepared as the interlayer 113. Finally, the laminated glass structure is formed by the vehicle-glass production process.

Example 6

The outer glass 112 and the inner glass 111 each are grey glass with the thickness of 2.1 mm and the transmittance of about 40-50%. The first protective layer 15 (a SiN layer with the thickness of 10 nm), the metal absorption layer 12 (the NiCr layer with the thickness of 7.2 nm), the high refractive-index layer (the $TiO_2$ layer with the thickness of 26 nm), the low refractive-index layer (the $SiO_2$ layer with the thickness of 36 nm), and the second protective layer 16 (the $Si_3N_4$ layer with the thickness of 15 nm) are sequentially deposited on the first surface 1111 of the inner glass 111 by means of the magnetron sputtering. The $TiO_2$ layer with the thickness of 26 nm and the $SiO_2$ layer with the thickness of 36 nm constitute the anti-reflective layer 13. After the deposition of the coating is finished, the high-temperature bending treatment is performed on the outer glass 112 and the inner glass 111. Then the PVB with the thickness of 0.76 mm and the visible-light transmittance of about 90% is prepared as the interlayer 113. Finally, the laminated glass structure is formed by the vehicle-glass production process.

Comparative Example 1

The outer glass 112 and the inner glass 111 each are clear glass with the thickness of 2.1 mm. No coating is deposited. The high-temperature bending treatment is performed on the outer glass 112 and the inner glass 111. Then the PVB with the thickness of 0.76 mm and the visible-light transmittance of about 10% is prepared as the interlayer 113. Finally, the laminated glass structure is formed by the vehicle-glass production process.

Comparative Example 2

The outer glass 112 and the inner glass 111 each are clear glass with the thickness of 2.1 mm. The high refractive-index layer (the $TiO_2$ layer with the thickness of 5 nm) and the low refractive-index layer (the $SiO_2$ layer with the thickness of 130 nm) are sequentially deposited on the first surface 1111 of the inner glass 111 by means of the magnetron sputtering, while no metal absorption layer 12 is deposited. The $TiO_2$ layer with the thickness of 5 nm and the $SiO_2$ layer with the thickness of 130 nm constitute the anti-reflective layer 13. After the deposition of the coating is finished, the high-temperature bending treatment is performed on the outer glass 112 and the inner glass 111. Then the PVB with the thickness of 0.76 mm and the visible-light transmittance of about 10% is prepared as the interlayer 113. Finally, the laminated glass structure is formed by the vehicle-glass production process.

Comparative Example 3

The outer glass 112 and the inner glass 111 each are clear glass with the thickness of 2.1 mm. The high refractive-index layer (the $TiO_2$ layer with the thickness of 10 nm), the low refractive-index layer (the $SiO_2$ layer with the thickness of 48 nm), the high refractive-index layer (the $TiO_2$ layer with the thickness of 106 nm), and the low refractive-index layer (the $SiO_2$ layer with the thickness of 96 nm) are sequentially deposited on the first surface 1111 of the inner glass 111 by means of the magnetron sputtering, while no metal absorption layer 12 is deposited. The $TiO_2$ layer with the thickness of 10 nm, the $SiO_2$ layer with the thickness of 48 nm, the $TiO_2$ layer with the thickness of 106 nm, and the $SiO_2$ layer with the thickness of 96 nm constitute the anti-reflective layer 13. After the deposition of the coating is finished, the high-temperature bending treatment is performed on the outer glass 112 and the inner glass 111. Then the PVB with the thickness of 0.76 mm and the visible-light transmittance of about 10% is prepared as the interlayer 113. Finally, the laminated glass structure is formed by the vehicle-glass production process.

Comparative Example 4

The outer glass 112 and the inner glass 111 each are clear glass with the thickness of 2.1 mm. The first protective layer 15 (the $Si_3N_4$ layer with the thickness of 16 nm), the metal absorption layer 12 (the NiCr layer with the thickness of 7.5 nm), and the second protective layer 16 (the $Si_3N_4$ layer with the thickness of 58 nm) are sequentially deposited on the first surface 1111 of the inner glass 111 by means of the magnetron sputtering, while no anti-reflective layer 13 is not deposited. After the deposition of the coating is finished, the high-temperature bending treatment is performed on the outer glass 112 and the inner glass 111. Then the PVB with the thickness of 0.76 mm and the visible-light transmittance of about 10% is prepared as the interlayer 113. Finally, the laminated glass structure is formed by the vehicle-glass production process.

Visible-light reflectivities, reflected colors of laminated glass structures of comparative examples 1 to 4 and example 3 are measured, and measurement results are shown in Table 1.

TABLE 1

Laminated glass structures and measurement results of comparative examples 1 to 4 and example 3

| | | Comparative example 1 | Comparative example 2 | Comparative example 3 | Comparative example 4 | Example 3 |
|---|---|---|---|---|---|---|
| Outer glass | | 2.1 mm clear glass | | | | |
| Interlayer | | 0.76 mm grey PVB (about 10% of visible-light transmittance) | | | | |
| Inner glass | | 2.1 mm clear glass | | | | |
| Coating structure | First protective layer 15 | / | / | / | 16 nm $Si_3N_4$ | 10 nm $Si_3N_4$ |
| | Low-emissivity layer 17 | | / | / | / | / |
| | Barrier layer 18 | | / | / | / | / |
| | Metal absorption layer 12 | | / | / | 7.5 nm NiCr | 6.5 nm NiCr |
| | Anti-reflective layer 13 | | 5 nm $TiO_2$/ 130 nm $SiO_2$ | 10 nm $TiO_2$/ 48 nm $SiO_2$/ 106 nm $TiO_2$/ 96 nm $SiO_2$ | / | 26 nm $TiO_2$/ 34 nm $SiO_2$ |
| | Second protective layer 16 | | / | / | 58 nm $Si_3N_4$ | 15 nm $Si_3N_4$ |
| Sum thickness of coating | | | 135 nm | 260 nm | 81.5 nm | 91.5 nm |
| Visible-light reflectivity (after high-temperature heat treatment) of inner glass measured from the first surface | | 8.50% | 5.82% | 4.72% | 3.72% | 3.82% |
| Visible-light reflectivity of sunroof glass 10 measured from the inner surface 11a | | 4.80% | 2.20% | 1.92% | 2.06% | 1.68% |
| Lab values of reflected colors of sunroof glass 10 measured from the inner surface 11a | L | 25.6 | 15.8 | 12.8 | 16.5 | 11.2 |
| | a | −0.08 | 8.2 | −0.9 | 9.8 | −4.2 |
| | b | −0.72 | −12.5 | −10.2 | −25.2 | −1.2 |

The visible-light reflectivity (after high-temperature heat treatment) of the inner glass measured from the first surface is a visible-light reflectivity of one sheet of inner glass directly measured from the first surface after the high-temperature bending treatment is performed on the inner glass deposited with the coating and before the laminated glass structure is formed. The visible-light reflectivity of the sunroof glass measured from the inner surface is a visible-light reflectivity of the sunroof glass measured from the inner surface after the outer glass subjected to the high-temperature bending treatment, the inner glass deposited with the coating, and the interlayer are formed into the laminated glass structure by the vehicle-glass production process.

It can be seen from Table 1 that in comparative example 1, the visible-light reflectivity of the inner glass 111 without the deposited metal absorption layer 12 and the deposited anti-reflective layer 13 is greater than 8%. Then, even if the inner glass 111 without the deposited metal absorption layer 12 and the deposited anti-reflective layer 13, the interlayer 113, and the outer glass 112 are formed into the laminated glass structure as the sunroof glass 10, the visible-light reflectivity of the sunroof glass 10 measured from the inner surface 11*a* is still greater than 4%, and a relatively obvious mirror effect exists.

In comparative example 2, by disposing the anti-reflective layer 13, that is, a stacking including the high refractive-index layer 131 and the low refractive-index layer 132, the visible-light reflectivity of the first surface 1111 of the inner glass 111 is reduced to 5%-6%. Then the anti-reflective layer 13, the inner glass 111, the interlayer 113, and the outer glass 112 are formed into the laminated glass structure as the sunroof glass 10. The visible-light reflectivity of the sunroof glass 10 measured from the inner surface 11*a* is less than 3%. However, through the Lab color test, it is found that when viewed from the inside of the vehicle, the reflected color by the sunroof glass 10 is reddish-purple, which considerably deviates from the neutral color, and is not easily accepted by the passenger.

In comparative example 3, by disposing two stackings each including the high refractive-index layer 131 and the low refractive-index layer 132, the visible-light reflectivity of the first surface 1111 of the inner glass 111 is reduced to 4%-5%. Then, the two stackings each including the high refractive-index layer 131 and the low refractive-index layer 132, the inner glass 111, the interlayer 113, and the outer glass 112 are formed into the laminated glass structure as the sunroof glass 10. The visible-light reflectivity of the sunroof glass 10 measured from the inner surface 11*a* is less than 2%. When viewed from the inside of the vehicle, the reflected color of the sunroof glass 10 is also relatively neutral. However, the sum thickness of the coating is 260 nm, which is not conducive to the manufacturing process and is relatively high in production cost.

In comparative example 4, by employing a nickel-chromium alloy (NiCr) as the metal absorption layer 12, the visible-light reflectivity of the first surface 1111 of the inner glass 111 is less than 4%. Then, the metal absorption layer 12, the inner glass 111, the interlayer 113, and the outer glass 112 are formed into the laminated glass structure as the sunroof glass 10. The visible-light reflectivity of the sunroof glass 10 measured from the inner surface 11*a* is less than 3%. However, through the Lab color test, it is found that when viewed from the inside of the vehicle, the reflected coating structure, the inner glass 111, the interlayer 113, and the outer glass 112 are formed into the laminated glass structure as the sunroof glass 10. The visible-light reflectivity of the sunroof glass 10 measured from the inner surface 11*a* is less than 2%. In addition, when viewed from the inside of the vehicle, the reflected color of the sunroof glass 10 also meets the requirement of neutral color. Compared to comparative example 3, the sum thickness of the coating in example 3 is about one third of the sum thickness of the coating in comparative example 3, thereby providing significant advantages in terms of manufacturing process and cost.

Visible-light reflectivities and reflected colors of laminated glass structures of examples 1 to 6 are measured, and measurement results are shown in Table 2.

TABLE 2

Laminated glass structures and measurement results of examples 1 to 6

| | | Example 1 | Example 2 | Example 3 | Example 4 | Example 5 | Example 6 |
|---|---|---|---|---|---|---|---|
| Outer glass | | 2.1 mm clear glass | | | | | 2.1 mm grey glass |
| Interlayer | | 0.76 mm grey PVB (about 10% of visible-light transmittance) | | | | | 0.76 mm transparent PVB |
| Inner glass | | 2.1 mm clear glass | | | | | 2.1 mm grey glass |
| Coating structure | First protective layer 15 | 10 nm $Si_3N_4$ | / | 10 nm $Si_3N_4$ | 10 nm $ZnSnO_x$ | 10 nm $Si_3N_4$ | 10 nm $Si_3N_4$ |
| | Low-emissivity layer 17 | / | / | / | / | 138 nm ITO/ | / |
| | Barrier layer 18 | / | / | / | / | 10 nm $Si_3N_4$/ | / |
| | Metal absorption layer 12 | 6.5 nm NiCr | 6.5 nm NiCr | 6.5 nm NiCr | 6.5 nm NiCr | 8.5 nm NiCr | 7.2 nm NiCr |
| | Anti-reflective layer 13 | 26 nm $TiO_2$/ 36 nm $SiO_2$ | 26 nm $TiO_2$/ 32 nm $SiO_2$ | 26 nm $TiO_2$/ 34 nm $SiO_2$ | 26 nm $TiO_2$/ 34 nm $SiO_2$ | 34 nm $TiO_2$/ 63 nm $SiO_2$ | 26 nm $TiO_2$/ 36 nm $SiO_2$ |
| | Second protective layer 16 | / | 15 nm $Si_3N_4$ | 15 nm $Si_3N_4$ | 15 nm $Si_3N_4$ | 10 nm $Si_3N_4$ | 15 nm $Si_3N_4$ |
| Sum thickness of coating | | 78.5 nm | 79.5 nm | 91.5 nm | 91.5 nm | 273.5 nm | 94.2 nm |
| Visible-light reflectivity (before high-temperature heat treatment) of inner glass measured from the first surface | | 3.12% | 3.4% | 3.52% | 3.32% | 3.42% | 1.58% |
| Visible-light reflectivity (after high-temperature heat treatment) of inner glass measured from the first surface | | 4.52% | 6.72% | 3.82% | 4.62% | 3.91% | 1.92% |
| Visible-light reflectivity of sunroof glass 10 measured from the inner surface 11a | | 2.86% | 3.12% | 1.68% | 2.45% | 1.88% | 1.92% |
| Lab values of reflected colors of sunroof glass 10 measured from the inner surface 11a | L | 11.5 | 15.8 | 11.2 | 12.5 | 18.4 | 15.1 |
| | a | −2.2 | -3.5 | -4.2 | −3.2 | 0.26 | −1.92 |
| | b | −8.1 | −11.2 | -1.2 | −2.1 | −10.3 | −8.2 |

color of the sunroof glass 10 is considerably deviated from the neutral color, and is not easily accepted by the passenger.

By comparison, it is found that with the coating structure of example 3, the visible-light reflectivity of the first surface 1111 of the inner glass 111 can be less than 4%. Then the The visible-light reflectivity (before the high-temperature heat treatment) of the inner glass measured from the first surface is a visible-light reflectivity of one sheet of inner glass directly measured from the first surface after deposition of the coating on the inner glass and before the high-temperature bending treatment. The visible-light reflectivity (after the high-temperature heat treatment) of the inner glass measured from the first surface is a visible-light reflectivity of one sheet of inner glass directly measured from the first surface after the high-temperature heat treatment is performed on the inner glass deposited with the coating and before the laminated glass structure is formed. The visible-light reflectivity of the sunroof glass measured from the inner surface is a visible-light reflectivity of the sunroof glass measured from the inner surface after the outer glass subjected to the high-temperature bending treatment, the inner glass deposited with the coating, and the interlayer are formed into the laminated glass structure by the vehicle-glass production process.

It can be seen from Table 2 that in each of examples 1 to 6, the visible-light reflectivity of the sunroof glass 10 measured from the inner surface 11*a* is less than 4%, or less than 3% or even less than 2%. In addition, in each of examples 1 to 6, a reflected color of the sunroof glass 10 measured from the inner surface has a value of a ranging from −6 to 2 (both inclusive) and a value of b ranging from −12 to 0 (both inclusive). In other words, in examples 1 to 6, the sunroof glass 10 can eliminate the mirror effect inside the vehicle and has an excellent neutral color viewed from the inside of the vehicle. In example 6, grey glass is employed as the outer glass and the inner glass, but due to the technical solution of the present disclosure, the visible-light reflectivity less than 2% can still be obtained as well as the requirement of the neutral color can be met.

In examples 1 to 4 and example 6, the sum thickness of the first protective layer 15, the metal absorption layer 12, the anti-reflective layer 13, and the second protective layer 16 may be less than or equal to 200 nm, preferably less than or equal to 150 nm, and even less than or equal to 100 nm, thereby providing significant advantages in terms of manufacturing process and cost.

In addition, it can be seen from example 2 that, when no first protective layer 15 is disposed, during the high-temperature bending treatment of the inner glass 111 deposited with the coating, the metal absorption layer 12 may be partially oxidized, and finally the visible-light reflectivity of the inner glass 111 measured from the first surface after the high-temperature bending treatment is greatly improved. As a result, after the inner glass 111 with no first protective layer 15, the interlayer 113, and the outer glass 112 are formed into the laminated glass structure as the sunroof glass 10, the visible-light reflectivity of the sunroof glass 10 measured from the inner surface 11*a* is less than 4%, and the reflected color of the sunroof glass 10 viewed from the inside of the vehicle also meets the requirement of neutral color, but Lab values of the reflected color in example 2 are not as excellent as Lab values of the reflected color in other examples.

In example 4, the first protective layer 15 is made of $ZnSnO_x$, while in example 3, the first protective layer 15 is made of $Si_3N_4$. The visible-light reflectivity of the inner glass 111 is measured from the first surface. Compared to example 3, before and after the high-temperature bending treatment, the change in visible-light reflectivity in example 4 is greater than the change in visible-light reflectivity in example 3. Preferably, the first protective layer 15 is made of nitrides of Si, which is further beneficial to improving the thermal stability of the coating and reducing the oxidation degree of the metal absorption layer 12.

It can be seen from example 5 that even if the low-emissivity layer 17 is additionally disposed, in addition to the low-emissivity function of the sunroof glass 10, the low visible-light reflectivity and the excellent neutral color can still be maintained.

The above are exemplary embodiments of the present disclosure. It may be noted that for those of ordinary skill in the art, several improvements and modifications can be made without departing from the principle of the present disclosure, and these improvements and modifications also belong to the scope of protection of the present disclosure.

What is claimed is:

1. Sunroof glass, comprising a glass substrate, a metal absorption layer, and an anti-reflective layer, wherein the glass substrate has an outer surface and an inner surface, and the metal absorption layer and the anti-reflective layer are sequentially stacked on the inner surface in a direction away from the glass substrate; wherein the anti-reflective layer comprises at least one stacking comprising a high refractive-index layer and a low refractive-index layer, the high refractive-index layer and the low refractive-index layer are sequentially stacked in the direction away from the glass substrate, the high refractive-index layer has a refractive index greater than or equal to 1.7, and the low refractive-index layer has a refractive index less than 1.7;

the metal absorption layer is made of a combination of one or more of nickel (Ni), chromium (Cr), iron (Fe), titanium (Ti), molybdenum (Mo), zirconium (Zr), silicon (Si), or niobium (Nb), and has a thickness ranging from 6.5 nm to 15 nm; and the sunroof glass does not comprise a low-emissivity layer, and a sum thickness of the metal absorption layer and the anti-reflective layer is less than or equal to 100 nm.

2. The sunroof glass of claim 1, further comprising a first protective layer, wherein the first protective layer is disposed on the inner surface and located between the inner surface and the metal absorption layer, the first protective layer has a thickness greater than or equal to 5 nm, and the first protective layer is made of an oxide or an alloy oxide of zinc (Zn), tin (Sn), Ti, Si, aluminium (Al), Nb, Zr, Ni, magnesium (Mg), Cr, or tantalum (Ta), or made of a nitride or an alloy oxynitride of Si, Al, Zr, boron (B), or Ti.

3. The sunroof glass of claim 1, further comprising a second protective layer, wherein the second protective layer is disposed on a surface of the anti-reflective layer away from the metal absorption layer, the second protective layer is made of a nitride or an alloy oxynitride of Si, Al, Zr, Ti, B, or Ni, and the second protective layer has a thickness greater than or equal to 3 nm and less than or equal to 30 nm.

4. The sunroof glass of claim 1, wherein the high refractive-index layer has a thickness ranging from 1 nm to 70 nm, and the low refractive-index layer has a thickness ranging from 20 nm to 150 nm.

5. The sunroof glass of claim 1, wherein the glass substrate is laminated glass, the laminated glass comprises inner glass, outer glass, and an interlayer disposed between the outer glass and the inner glass, the inner glass has a first surface and a second surface opposite to the first surface, the first surface is the inner surface, the outer glass has a third surface and a fourth surface opposite to the third surface, and the fourth surface is the outer surface.

6. The sunroof glass of claim 5, wherein the glass substrate further comprises at least one infrared reflecting layer, and the at least one infrared reflecting layer is located on the second surface and/or the third surface, and the at least one infrared reflecting layer each comprises at least one metallic functional layer and a plurality of dielectric layers.

7. The sunroof glass of claim 6, wherein the at least one infrared reflecting layer each is a single-silver coating, a double-silver coating, a triple-silver coating, or a four-silver coating.

8. The sunroof glass of claim 5, wherein a visible-light transmittance of the sunroof glass ranges from 1% to 20%, a visible-light reflectivity of the sunroof glass measured from the inner surface is less than or equal to 4%, and a reflected color of the sunroof glass measured from the inner surface has a value of a ranging from −6 to 2 and a value of b ranging from −12 to 0 in a color space Lab.

9. The sunroof glass of claim 8, wherein the outer glass has a visible-light transmittance greater than or equal to 70%, the inner glass has a visible-light transmittance greater than or equal to 70%, and the interlayer has a visible-light transmittance ranging from 1% to 30%.

10. The sunroof glass of claim 8, wherein the outer glass has a visible-light transmittance less than or equal to 50%, the inner glass has a visible-light transmittance less than or equal to 50%, and the interlayer has a visible-light transmittance greater than or equal to 70%.

11. The sunroof glass of claim 8, further comprising a dimming element disposed between the second surface and the third surface, wherein the dimming element comprises one or more of a polymer dispersed liquid crystal (PDLC) dimming film, a polymer network liquid crystal (PNLC) dimming film, a suspended particle device (SPD) dimming film, or an electrochromic (EC) dimming film.

12. The sunroof glass of claim 1, wherein the glass substrate is one sheet of tempered glass, and the tempered glass has a thickness greater than or equal to 5 mm; and the tempered glass is tinted glass, and a total iron content of the tinted glass measured by $Fe_2O_3$ ranges from 0.5% to 2.0%.

13. The sunroof glass of claim 1, further comprising a first protective layer and a second protective layer, wherein a sum thickness of the first protective layer, the metal absorption layer, the anti-reflective layer, and the second protective layer is less than or equal to 100 nm.

14. The sunroof glass of claim 1, wherein the sum thickness of the metal absorption layer and the anti-reflective layer is less than or equal to 69.2 nm.

15. A vehicle comprising a vehicle body and sunroof glass, wherein the sunroof glass comprises a glass substrate, a metal absorption layer, and an anti-reflective layer, the glass substrate has an outer surface and an inner surface, and the metal absorption layer and the anti-reflective layer are sequentially stacked on the inner surface in a direction away from the glass substrate; wherein the sunroof glass is connected to the vehicle body;

the anti-reflective layer comprises at least one stacking comprising a high refractive-index layer and a low refractive-index layer, the high refractive-index layer and the low refractive-index layer are sequentially stacked in the direction away from the glass substrate, the high refractive-index layer has a refractive index greater than or equal to 1.7, and the low refractive-index layer has a refractive index less than 1.7;

the metal absorption layer is made of a combination of one or more of nickel (Ni), chromium (Cr), iron (Fe), titanium (Ti), molybdenum (Mo), zirconium (Zr), silicon (Si), or niobium (Nb), and has a thickness ranging from 6.5 nm to 15 nm; and the sunroof glass does not comprise a low-emissivity layer, and a sum thickness of the metal absorption layer and the anti-reflective layer is less than or equal to 100 nm.

* * * * *